United States Patent [19]

Sokol

[11] 4,245,282
[45] Jan. 13, 1981

[54] ILLUMINATING DEVICE

[76] Inventor: Peter L. Sokol, 1197 Loudon Rd., Cohoes, N.Y. 12047

[21] Appl. No.: 51,729

[22] Filed: Jun. 25, 1979

[51] Int. Cl.³ .............................. F21V 9/16; F21S 3/00
[52] U.S. Cl. ..................................... 362/84; 362/217; 362/260
[58] Field of Search .................... 362/34, 84, 217, 222, 362/226, 260, 351, 358, 377, 376, 171, 174

[56] References Cited

U.S. PATENT DOCUMENTS

| | | | |
|---|---|---|---|
| 544,331 | 8/1895 | Warner | 362/376 |
| 2,644,113 | 6/1953 | Etzkorn | 362/84 |
| 2,713,629 | 7/1955 | Etzkorn | 362/84 |
| 3,798,481 | 3/1974 | Pollara | 362/377 |

FOREIGN PATENT DOCUMENTS 20073 of 1897 United Kingdom ..................... 362/376

OTHER PUBLICATIONS

Clark, "The Encyclopedia of Chemistry", 2 Ed. (1966), pp. 808–809.

Primary Examiner—Donald P. Walsh
Attorney, Agent, or Firm—Joseph V. Claeys

[57] ABSTRACT

An illuminating device for providing a temporary light source when the power source is interrupted comprising a fluorescent lamp with a net impregnated with phosphorescent material affixed in close proximity thereto.

6 Claims, 3 Drawing Figures

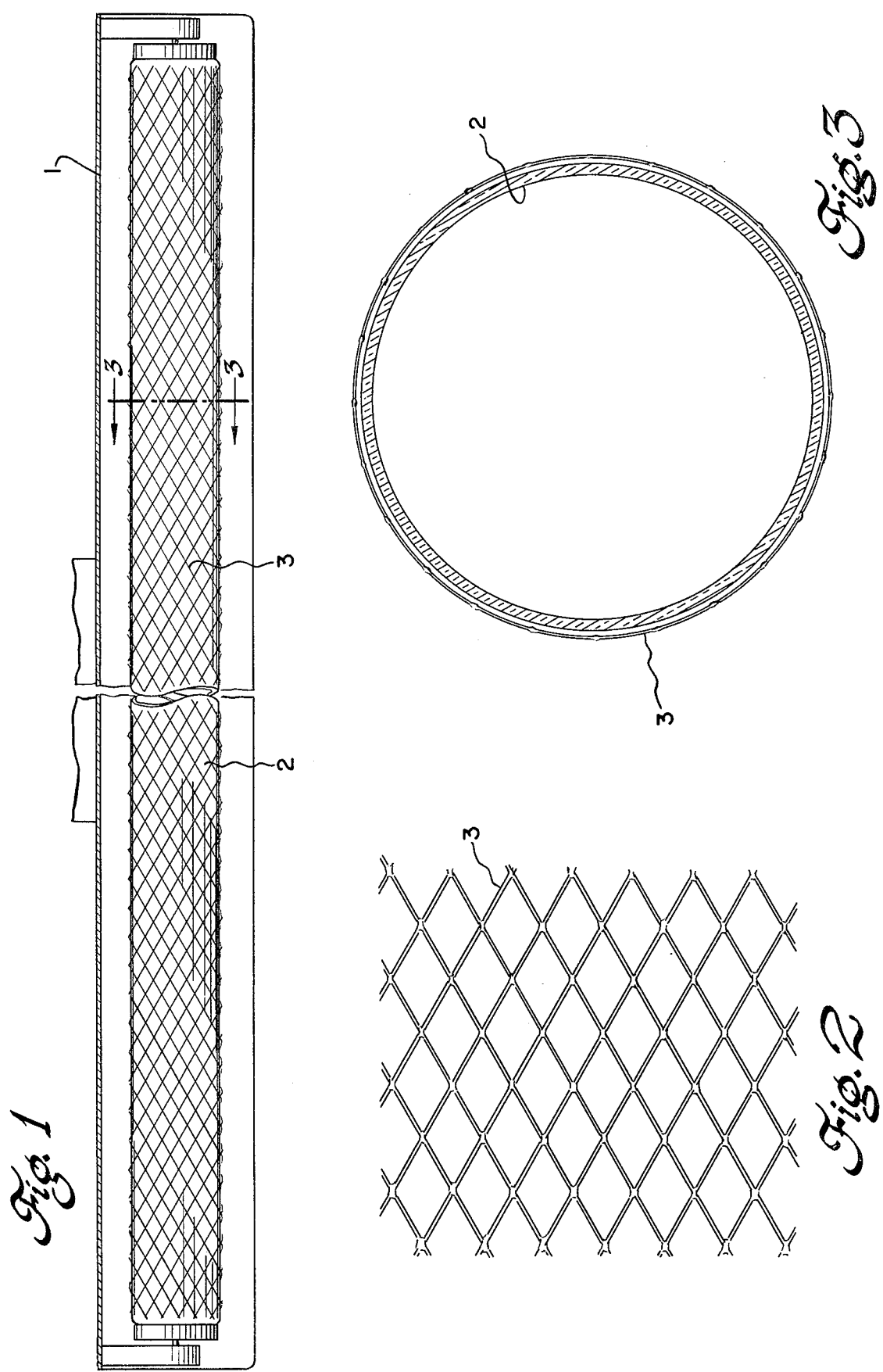

ILLUMINATING DEVICE

SUMMARY OF THE INVENTION

Briefly stated the invention provides a means for temporarily lighting an area when a fluorescent lamp is turned off either by design or by power failure. More particularly, a net or web like material, through which light can easily pass, is treated with a phosphorescent material and the net affixed near the lamp. For best results the net is annularly disposed around said lamp to receive the maximum charge from the lamp. When the electric power for the lamp is interrupted, the treated net glows in the dark providing light for from 5 to 10 minutes. In a power failure this allows light for a sufficient time to obtain an auxillary light or to fix the power failure when it is the result of a burned out fuse or activated circuit breaker.

BRIEF DESCRIPTION OF THE DRAWING

In the Drawing:

FIG. 1 shows a side view of a fluorescent lamp with a phosphorescent treated net annularly disposed around the lamp.

FIG. 2 shows a portion of the net-like material; and

FIG. 3 is a sectional view of the fluorescent lamp tube taken along the line 3—3.

Referring to the drawing reference numeral 1 is the lamp base and support for lamp 2. The phosphorescent treated net 3 is shown in a preferred embodiment as annularly disposed around the lamp. The net can be affixed to one side of the lamp, however, it may be affixed to a bottom portion or hung as close to the lamp as possible so as to obtain the maximum charge. Conveniently the net may be in the form of a sleeve and the fluorescent lamp tube disposed within the sleeve.

The net can be formed from a variety of materials as the lamp does not give off significant heat. Typical materials which are commercially available include nylon, polyethelene, poly (vinyl chloride) and fiber glass. Conveniently, the material may be any of the commercially available plastic netting which is extruded as a sleeve in mesh form. A sleeve of such material having a suitable inside diameter may be simply slipped over a conventional fluorescent lamp tube.

Phosphorescent materials which can be employed are those which glow in the dark after exposure to light and include a number of materials. Typical materials are the sulfides of calcium, barium and zinc with a trace amount of a radioactive substance like radium. The phosphorescent material can be applied to the net by conventional means such as spraying and dipping.

While only a preferred embodiment has been shown and described by way of illustration, many modifications and changes will occur to those skilled in the art. It is therefore to be understood that the appended claims are intended to cover all such modifications and changes as fall within the true spirit and scope of the invention.

I claim:

1. An illuminating device comprising a fluorescent lamp and phosphorescent material affixed in close proximity to said lamp by means of a net impregnated with said phosphorescent material, said net being operative when said fluorescent lamp is extinquished to provide continued illumination for a temporary period.

2. The device of claim 1 wherein the net is formed of nylon.

3. The device of claim 1 wherein the phosphorescent material is selected from the group consisting of calcium sulfide, barium sulfide and zinc sulfide.

4. The device of claim 1 wherein the net is formed of fiber glass.

5. The device of claim 1 wherein the impregnated net is annularly disposed around said lamp to form a closed loop about said lamp.

6. The device of claim 5 wherein the net is substantially in the form of a sleeve having a size the same as the circumferance of the lamp so as to fit closely over said lamp.

* * * * *